Sept. 21, 1948.　　　W. H. GEDDES ET AL　　　2,449,696
OIL TEMPERATURE REGULATOR
Filed Dec. 14, 1943　　　　　　　　　　4 Sheets-Sheet 1
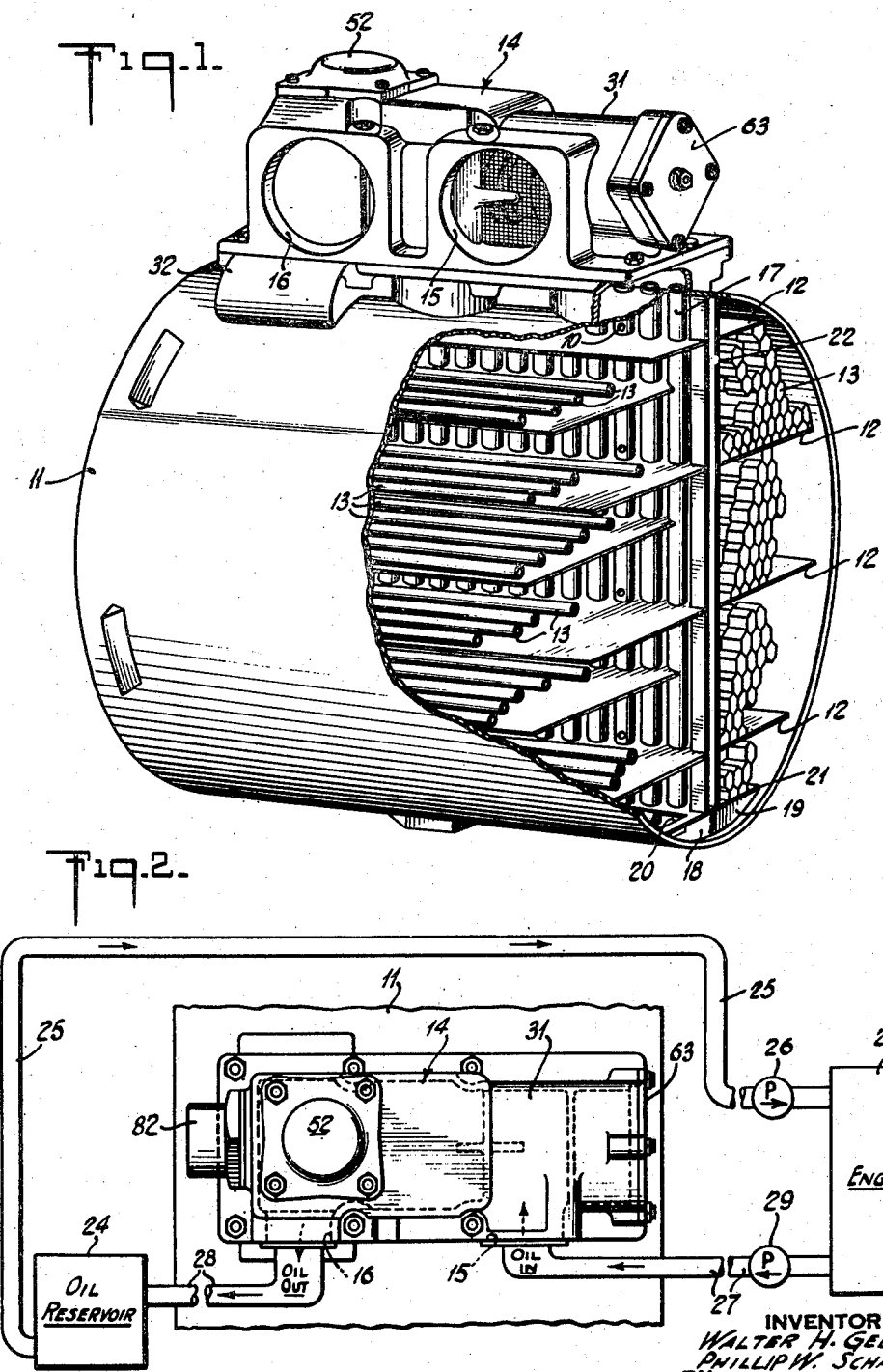
INVENTORS
WALTER H. GEDDES.
PHILLIP W. SCHANKE.
BY
C. B. Stevens
ATTORNEY

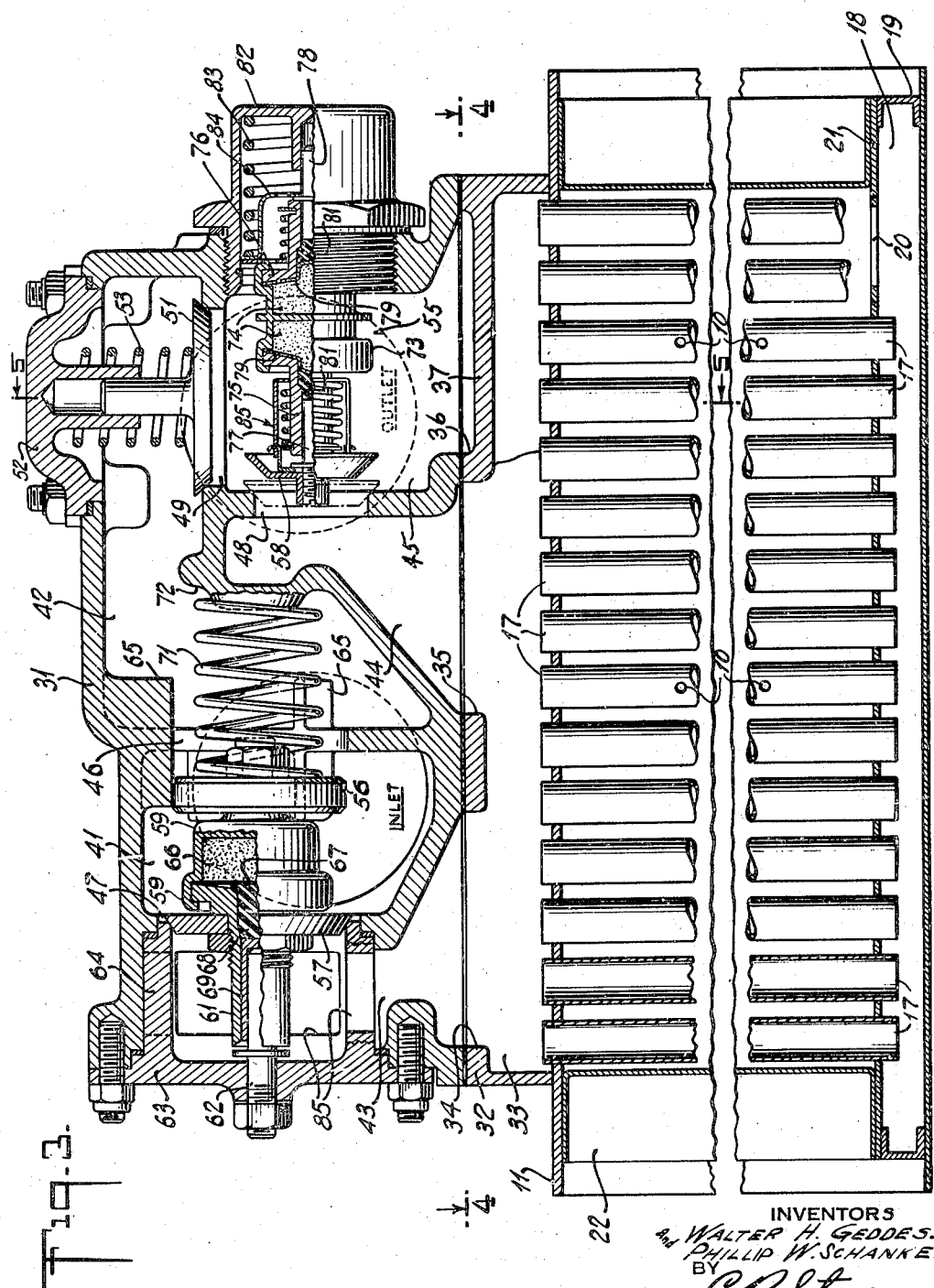

Sept. 21, 1948.  W. H. GEDDES ET AL  2,449,696
OIL TEMPERATURE REGULATOR

Filed Dec. 14, 1943  4 Sheets-Sheet 3

INVENTORS
WALTER H. GEDDES
PHILLIP W. SCHANKE.
BY
CB Stevens
ATTORNEY

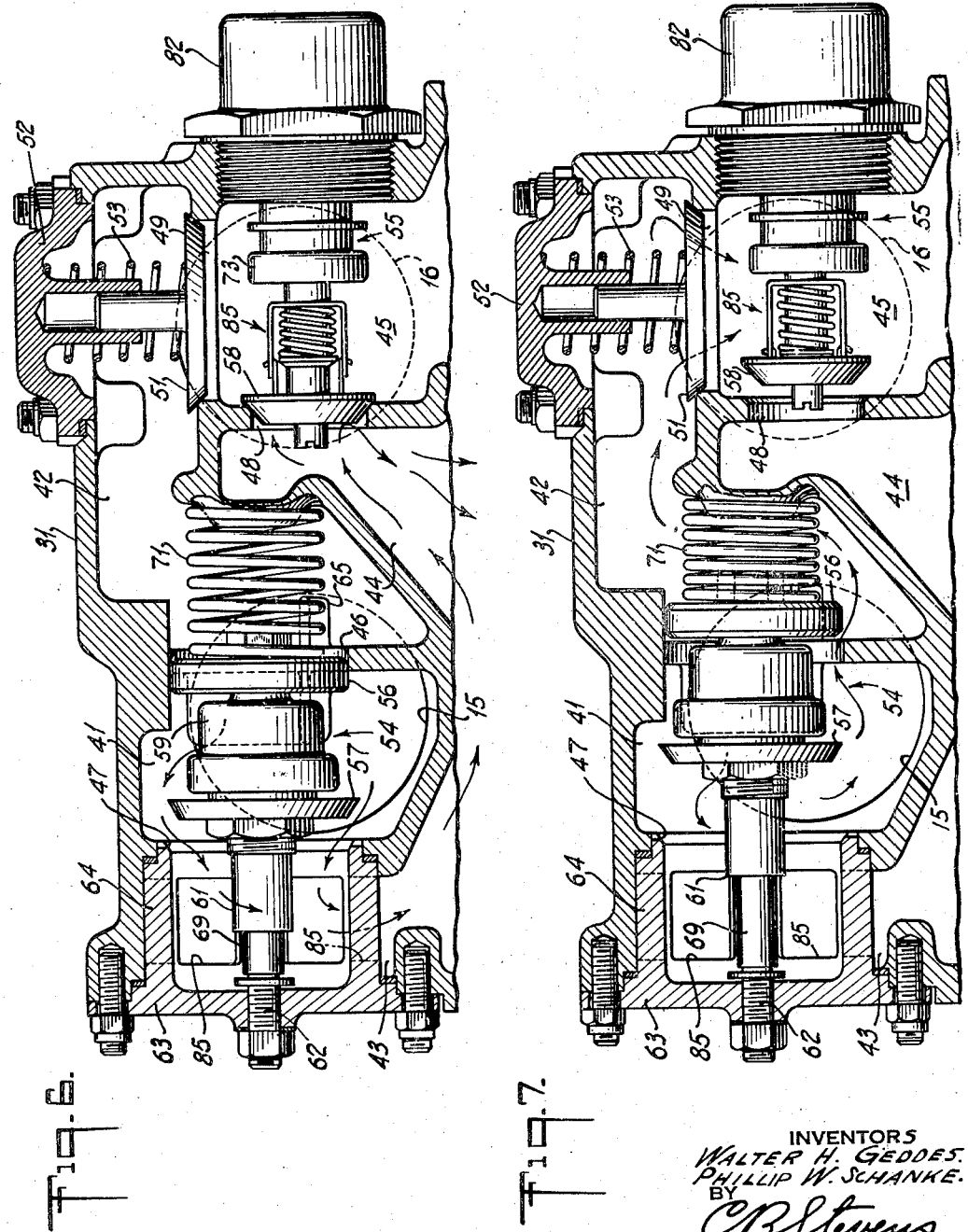

Patented Sept. 21, 1948

2,449,696

UNITED STATES PATENT OFFICE 2,449,696

OIL TEMPERATURE REGULATOR

Walter H. Geddes and Phillip W. Schanke, Dayton, Ohio, assignors to United Aircraft Products, Inc., Dayton, Ohio, a corporation of Ohio Application December 14, 1943, Serial No. 514,300

7 Claims. (Cl. 257—2)

1

This invention relates to temperature regulating apparatus for use in a system circulating fluid under pressure and under conditions causing a progressive heating of the fluid. The invention has particular application to temperature regulators as used to obtain conditioning of the oil in the lubricating system of an internal combustion engine.

Oil temperature regulators are in general use in aircraft, where it is their function to prevent overheating of the lubricating oil supplied to the engine. Their primary mode of operation is one of continuous cooling, and is effected by interposing in the oil line, apparatus wherein the oil flows in heat exchange relationship with an assembly of air cooled tubes. Operation of the aircraft under varying flight conditions and at varying air temperatures makes it undesirable to subject the oil to a cooling process at all times. Moreover, the tendency of excessively cooled oil to congeal results in the occasional formation of a restriction in the cooling passage through the tube assembly and the consequent attainment of high pressures in the oil lines, against the effects of which the regulator must be protected. The latter problem is complicated by the fact that while the regulator must be protected from surge pressures and the like, warm oil at some pressure should be admitted to the tube assembly in order that congealed oil therein may be thawed and the cooling passage therethrough be reestablished.

Because of the requirements of oil temperature regulation regarding control of the oil flow, regulators customarily are provided with control devices including relief means for by-passing the oil around the cooling passage when the oil is not in need of cooling and when the pressure thereof rises above a safe level. Prior art control devices have a limited range of effectiveness in that the regulator is inadequately protected against the hazards of cold weather starting and from surge pressures in general; deficiency of control resulting largely from the practice of relying on a single relief means which is placed beyond the point of entrance to the cooling passage. As a consequence the tube assembly is subject to all the varying pressures of the system. In some instances, as when starting the engine with the oil lines congealed, these pressures may rise well above the predetermined pressure designed to be maintained by the relief means.

The principal object of this invention is to produce an oil temperature regulator having a generally new system of flow control, providing the regulator with pressure protection under all conditions of operation.

A more specific object of the invention is to cut off the cooling passage through the regulator from communication with the oil line until the oil flowing in the line has been warmed to a predetermined temperature.

Another object is to prevent the tube assembly from being made subject to pressures higher than one predetermined to exercise the desired thawing and expelling action on congealed oil in the assembly.

A further object is to increase the degree of control had on the oil flow in order that it may be held more precisely to a predetermined temperature.

In carrying out these objects a practical embodiment of the invention has been developed in which a plurality of control devices have been combined in simple compact form in an oil temperature regulator of known construction, a feature of the combination being an arrangement placing one control assembly in advance of the entrance to the cooling passageway and a second control assembly beyond such entrance, with the first assembly functioning to divert surge pressures and cold viscous oil from the passageway and the second assembly functioning to permit and prevent cooling within a relatively close range of oil temperatures and to limit the pressure applied to the oil in the tube assembly.

Other objects and structural details of the invention will be apparent from the following description when read in connection with the accompanying drawings, wherein:

Fig. 1 is a view in perspective of an oil temperature regulator constructed in accordance with the present invention, part of the casing thereof being broken way to disclose the tube assembly;

Fig. 2 is a fragmentary top plan view of the regulator, showing in addition a diagram of an engine lubrication system disclosing the place the regulator occupies in the system;

Fig. 3 is a view in vertical longitudinal section through the regulator, the air cooled tubes and certain baffles associated therewith being omitted, and the parts being shown as they appear with the engine idle and the oil below operating temperatures;

Fig. 6 is a view of the regulator head similar to Fig. 3, showing the parts as they appear after the oil has been heated sufficiently to require cooling; and Fig. 7 is a view similar to Fig. 6, showing the parts as they appear under surge pressure.

Figure 4:
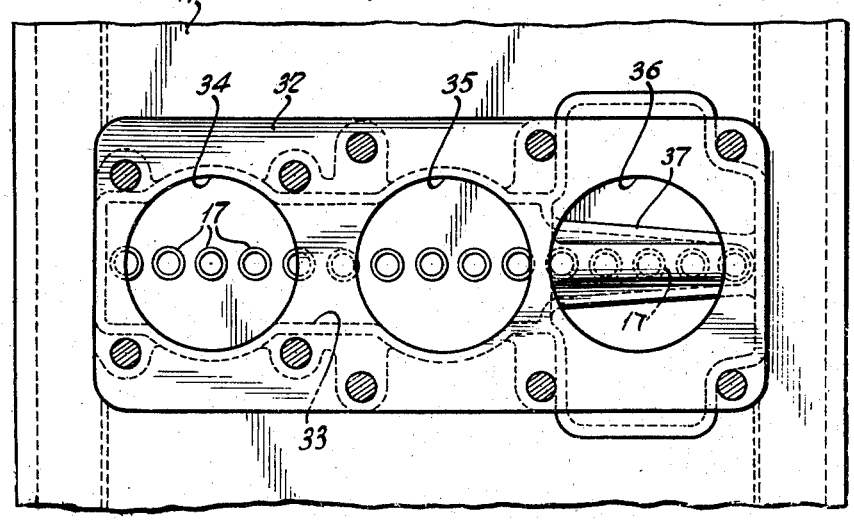
Fig. 4 is a fragmentary top plan view of the regulator with the cast body of the manifold head removed to disclose the flange secured to the regulator casing.

Referring to Fig. 1, an oil temperature regulator of the class to which the invention relates comprises a cylindrical shell 11 encasing a core made up of a plurality of longitudinally extending spaced partitions 12 and heat exchange tubes 13 filling the spaces between the partitions. The ends of the tubes 13 are expanded to a polygonal shape and occupy a nested relation with respect to each other, the arrangement being such that at the opposite ends of the core the tubes present a closed front while intermediate their ends within the shell 11 the tubes are spaced apart and define a maze for the passage of the oil which flows to and from the core through radial openings in the shell. To hold the tubes 13 in assembled relation and as a seal against the escape of oil from the core, the tube ends are secured together by a soldering operation. Similarly, the core is rigidly connected to the inner surface of the shell by means constituting a seal and a bond. The tubes 13 are open throughout their lengths for the passage of a coolant which may be fluid in any form. Conventionally, oil temperature regulators for aircraft are disposed in an air stream which passes through the core tubes, cooling the tubes and thereby the surrounding oil in the shell. The entry of the oil into the regulator and its discharge therefrom are effected through a manifold head 14 attached to the outer surface of the shell 11. The head 14 is provided with openings 15 and 16 constituting the regulator inlet and outlet and which are placed in communication through alternative fluid passes leading respectively through the regulator core and in by-passing relation thereto. The former of said passes includes a series of vertical tubes 17 which is centrally positioned in the shell 11, the tubes serving the purpose of conveying the oil from the head 14 to an oppositely located chamber 18 formed within the shell through the cooperation of end sections 19 and a cover plate 21 (see also Fig. 3). The plate 21 has openings 20 therein (one shown) allowing the oil to pass from chamber 18 into the tube maze constituting the core proper. Under the influence of continuously applied pressure, the oil progresses through the core toward the head 14 and outlet 16 and in so doing contacts successive tubes 13 and is cooled. The partitions 12 serve as baffles for the oil and preferably are staggered in such manner as to cause the oil to move in a tortuous zig-zag path. Thus the oil enters each core section at one end thereof, travels lengthwise along the tubes 13 to the other end of the section and then around the end of the next adjacent baffle into the adjoining section toward the outlet.

The vertical tubes 17 extend through suitable openings in the baffles 12 and are arranged in a longitudinal row. The center space occupied by the row of vertical tubes is closed at the ends of the cores by channel members 22.

As indicated in Fig. 2, the oil temperature regulator is a part of the lubricant circulating system, being interposed between the engine 23 and reservoir 24 in position to condition the oil after it leaves the engine and before its return to the reservoir. As shown, oil is delivered to the engine by way of a line 25, a pump 26 in the line acting to withdraw the oil from the reservoir and supply it to the engine under pressure. The oil leaves the engine by way of a line 27 connected to the inlet 15 of the oil temperature regulator, and after passing through the regulator continues on to the reservoir by way of a line 28 leading from the regulator outlet 16. A pump 29 in the line 27 acts as a scavenger in removing the oil from the engine and imparting to it a forced flow through the regulator to the reservoir. The pressure of the oil in the lines 27 and 28 and in the oil temperature regulator is at a minimum when the oil is in a warm fluid state and increases as a rising oil viscosity adds to the flow resistance. Thus, should the engine stand idle for several hours in a cold atmosphere, the oil in the lines and in the regulator around the air flow tubes 13 will congeal whereupon when the engine is next started a high pressure is established in back of the congealed oil as the pump 29 attempts to force oil from the engine past the restriction. Gradually, by the combination of such pressure and the warming effect of the hot oil from the engine the restriction represented by the congealed oil is removed. During the process of such removal, however, it is desirable to limit the pressure applied to the oil in the regulator core in order that the tubes 13 which are thinly constructed, will not collapse or be distorted. Accordingly there is embodied in the head 14 a variety of protective means in the form of selective by-passes, automatic controls therefor being provided in order that a congealed regulator core may be subjected to a limited pressure and to a warming decongealing action when the pressure in the oil lines is normal or below a predetermined maximum and to prevent the application to the core of higher pressures such as may result from congelation in the line downstream of the regulator, as well as surge pressures arising from any causes and a check valve at the terminal ends of said primary and alternative flow paths for denying access of surge pressures in said auxiliary by-pass to said primary and alternative paths.

Referring to Fig. 3, the head 14 includes a cast body 31 attached to the flat upper surface of a flange 32 welded or otherwise secured to the shell 11. The flange 32 has a longitudinal channel 33 overlying the upper ends of the vertical tubes 17 which extend out of the core a short distance through the shell 11. Two spaced openings 34 and 35 in the flange establish communication between the channel 33 and points in the body 31, while a third flange opening 36 (see Figs. 4 and 5) is cut off from the channel 33 by a rib 37 which has a longitudinal position astride one end of the row of tubes 17 to form an extension of the channel. The rib 37 defines on its opposite sides passages 38 (Fig. 5) adapted to register with shell openings 39 and so connect the regulator core to flange opening 36 and the communicating areas of the body 31.

Figure 5:
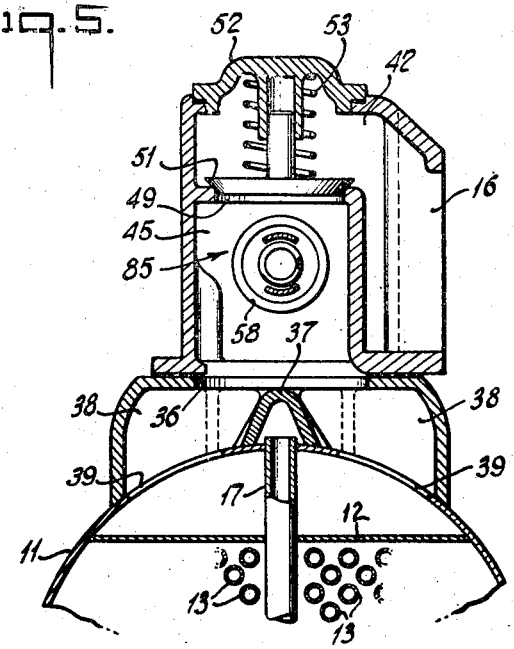
Fig. 5 is a fragmentary view in cross section, taken substantially along the line 5—5 of Fig. 3.

The body 31 is formed with internal walls which separate the interior of the body into a plurality of chambers, including a chamber 41 at the inlet 15 and a chamber 42 at the outlet 16 (see Fig. 5). Additional chambers, indicated at 43, 44 and 45 are formed opposite the respective flange openings 34, 35 and 36. The several chambers have ported entrances and exits for the passage of the oil and are arranged to provide a plurality of flow paths. Thus, oil entering the regulator is directed first to inlet chamber 41 and from there may pass through a port 46 to chamber 42 or through a port 47 to chamber 43, or it may pass through both ports simultaneously. Since chamber 42 communicates directly with the outlet, oil entering that chamber is discharged from the regulator. Oil entering the chamber 42 by way of port 46 in effect by-passes the regulator since this port in conjunction with chambers 41 and 42 constitutes a direct connection between the regulator inlet and outlet.

The oil leaving chamber 41 by way of port 47 passes through chamber 43 and registering flange port 34 into channel 33. Within the channel the oil may enter tubes 17 and begin a travel through the regulator core, or it may pass out of the channel through opening 35 and enter body chamber 44. Chamber 44 is connected through a port 48 with chamber 45, and the latter chamber is connected through a port 49 with chamber 42 and the outlet. Hence, port 48 in conjunction with opening 35, chamber 44 and chamber 45 constitute a passage by-passing the regulator core. In distinction from port 46, which by-passes the oil before it reaches the regulator core, the port 48 by-passes oil at a point in free communication with the entrance to the core.

The oil within channel 33 which enters the vertical tubes 17 is directed to the chamber 18 on the opposite side of the shell from which it may escape through openings 20 in the plate 21 into the core. Following the previously described tortuous path around the tubes 13 and past the baffles 12, the oil traverses the core and finally leaves the shell 11 through openings 39 (Fig. 5). Then, passing through registering passages 38 in the flange 32 the oil flows out of flange opening 36 and into the body chamber 45, the open lower end of which is aligned with the opening 36. From chamber 45 the oil may pass through port 49 to chamber 42 and the outlet. The oil flowing to chamber 45 from flange opening 36 is cooled oil since it has passed through the regulator core. Oil entering chamber 45 from flange opening 35, chamber 44 and port 48 is uncooled oil, having come directly from the engine.

In order to control the passage of the oil along the several flow paths above described, valve mechanism is provided, including a valve 51 mounted opposite the port 49 in a bushing cap 52 forming a part of the outer wall of chamber 42. The valve 51 is of the poppet type, being pressed by a spring 53 to a seated position closing the port 49 and adapted to open under the pressure of the oil in chamber 45 flowing to the outlet. It is intended that the valve 51 should function merely as a check valve, preventing any back pressure which may be present at the outlet from being transmitted through chamber 45 to the regulator core.

Further included in the control valve mechanism are a unit 54 in the chamber 41 and a unit 55 in the chamber 45. The unit 54 comprises a pair of aligned valves 56 and 57 controlling respectively the port 46 and the port 47, while the unit 55 comprises a valve 58 controlling the port 48. Considering first the unit 54, the valves 56 and 57 are secured respectively to aligned elements 59 and 61. Element 59 is in the form of a valve stem and element 61 is in the form of a sleeve slidably mounted on a stub shaft 62 fixed in a plate 63 closing the end of the body 31 and constituting a part of the wall of chamber 43.

The plate 63 has a cylindrical skirted portion 64 extending through chamber 43 into the port 47 and the inner end of such portion is adapted for engagement with the valve 57 to close the port 47, the valve 57 having a tapered periphery adapted to seat on the inner end of skirt 64 and prevent the flow of oil from chamber 41 to chamber 43. Valve 56 is cylindrical in shape and has a bearing in guide lugs 65 spaced circumferentially around the port 46, whereby it may move into and out of a position within the port to cut off and establish communication between the chambers 41 and 42. The sleeve 61 has a flanged end locked in engagement with the adjacent end of the stem 59, which adjacent end is enlarged and recessed to accommodate a thermal substance 66. The substance 66 expands when heated and acts through a diaphragm 67 upon a rubber or rubber-like connector 68 between the diaphragm and a cylindrical bearing 69 mounted on the stub shaft 62 and having a closed end abutting the shaft. Expansion of the thermal substance 66 is transmitted through the connector 68 and bearing 69 as an axial force upon the stub shaft 62. The shaft 62 being immovable, such force effects a reactive movement in a right hand direction, as viewed in Fig. 3, of the assembly comprising stem 59, sleeve 61 and valves 56 and 57. Movement so effected tends to withdraw the valve 57 from the port 47 and to cause the valve 56 to approach the port 46. Motion of the valve assembly under the compulsion of the thermal responsive substance 66 is opposed by a coil spring 71 interposed between the valve 56 and a seat 72 in a wall of the chamber 42. The valve 56 is adapted to close the port 46 by entering the port with a close fluid tight fit, and it further will be observed that, in the event of high oil pressures or from other causes, the valve may continue on through the port to again open it to the passage of oil.

Valve 58 of unit 55 in chamber 45 likewise is intended to be operated by thermal and pressure responsive means, and any of a variety of commercially known devices may be adopted as the valve control unit. In the illustrated instance, the unit comprises a thermostat case 73 containing two masses of a thermal responsive substance 74 which are allowed to expand in opposite directions. Opposed sleeves 75 and 76 extend from the case 73 and surround respective stub shafts 77 and 78 which are adapted to be extended by the thermal substance acting through diaphragms 79 and resilient connectors 81. The shaft 77 has the valve 58 secured to its outer end, while the shaft 78 is mounted for axial sliding movement in a housing 82 screw threaded in a bore in the wall of chamber 45. Confined within the housing 82 is a coil spring 83 which acts on the shaft 78 through a cup shaped washer 84 in a manner to resist extension of the shaft by the thermal means. Similarly, extension of the shaft 77 relatively to the sleeve 75 is resisted by a spring assembly 85. The force exerted by the spring assembly 85 is not effective to prevent extension of the shaft 77 but operates only to return the shaft when the thermal substance recedes from its expanded state. However, the spring 83 is relatively stronger and tends to hold shaft 78 against movement generated by the thermal substance. Accordingly, the forces exerted by both masses 74 operate to move the valve 58 toward the port 48—the left hand or forward mass acting directly on the shaft 77, and the right hand or rearward mass tending to move the entire assembly including case 73 and sleeves 75 and 76, relatively to the housing 82. The spring 83 functions as a relief spring, allowing the valve 58 and associated parts to move rearward, away from the port 48 when a predetermined pressure is brought to bear on the valve.

In the operation of the oil temperature regulator, the parts tend normally to assume the positions shown in Fig. 3. Thus the valve assembly of unit 54 is shifted leftward by spring 71 to seat valve 57 in closing position and place valve 56 in open position, while valve 58 of unit 55 is in open position with respect to the port 48 by reason of the thermal substance 74 being cool or unheated. With the parts so arranged, the oil inlet 15 and oil outlet 16 are directly connected through port 46, while the passages leading to and from the regulator core are closed by the valves 57 and 51. When the engine is first started the oil, which is not then in need of cooling, enters chamber 41 and, being prevented by the closed valve 57 from flowing to the regulator core, passes through port 46 to chamber 42 and outlet 16. Should the oil which remained in the lines of the system during the period of engine idleness be of high viscosity or congealed, the starting of the pumps will establish areas of temporary high pressure. However, the damaging effect such pressures would have reacting on the regulator core, is avoided by reason of the closed valves 57 and 51 denying access of the oil to the core.

The oil entering inlet chamber 41 comes in contact with the valve unit 54 and varies the temperature of the thermal substance 66 therein in accordance with its own temperature. Continued operation of the engine after it is started results in the oil discharged therefrom becoming progressively warmer, and such warmth transmitted to the thermal substance 66 causes expansion of the substance and movement of the assembly comprising valves 56 and 57 rightward (Fig. 3) against the pressure of spring 71.

Port 47 thereby is opened and the oil entering the regulator is free to pass into the skirted interior of the closure element 63 and through radial openings 85 therein to the flange channel 33. Until the valve 56 is moved far enough to close the port 46 a portion of the oil will continue to be by-passed through port 46. When the port 46 is closed the entire oil stream thereafter is directed through port 47 unless a restriction in the regulator causes a high pressure to develop, whereupon the valve 56 will be moved through and beyond port 46 to re-establish the by-pass (see Fig. 7). Within channel 33 the oil is permitted to flow both into the tubes 17 leading to chamber 18 and the regulator core, and through the by-pass port 48 to the outlet by way of chamber 45 and port 49. Within the chamber 45, the oil is in contact with the thermostat case 73 and as it gradually heats the thermal substance therein the valve 58 is moved to a seated position closing port 48. The parts then occupy the position shown in Fig. 6, and the oil stream is compelled to flow through the regulator core and be subjected to cooling. In the event of a restriction occurring in the core from congealment or other cause the pressure built up at the core entrance is relieved by an opening movement of valve 58 as the spring 83 yields to the higher pressure. The point at which the valve 58 opens under pressure preferably is pre-determined in order that there may be applied to the restriction in the core a pressure which is high enough quickly to remove the restriction but not sufficiently high to damage the air flow tubes 13. When the restriction has been removed the pressure immediately drops and valves 58 return to closed position.

The valve 58 also may be moved to open position by a cooling of the oil flowing around the thermostat case 73 from flange opening 36 and the regulator core. Accordingly, when the oil coming from the core drops below a predetermined temperature the valve 58 will withdraw from port 48 and permit a by-passing of the oil until it is again in need of cooling.

To illustrate more clearly the relation between the operation of the valves and oil temperature, there may be described a commercial embodiment of the invention as applied to aircraft. The data given is not restrictive, however, as the parts may be made to operate in very different temperature ranges. The indicated device is designed to maintain the oil at an operating temperature of approximately 160° F. When the oil is cold or not heated above a temperature of 106° it is passed directly to the outlet through port 46 and so circulates through the system without being cooled. At approximately 106° the assembly comprising valves 56 and 57 moves against the pressure of spring 71 to cause the former to approach port 46 and the latter to withdraw from port 47. Until an oil temperature of approximately 136° is reached the oil entering chamber 41 may flow both through port 46 and port 47. At 136° the port 46 closes and the entire oil stream is directed through port 47. Passing through port 47 the oil reaches flange channel 33 and from there may pass through the alternative paths represented by core inlet tubes 17 and by-pass port 48. Following the path of least resistance substantially all of the oil will by-pass through chamber 45 and around the thermostat case 73. As the oil temperature continues to rise the valve 58 moves toward port 48 and finally seats in a position closing the port as the temperature exceeds the predetermined figure of 160°. All by-passes then are closed to the oil which accordingly is compelled to flow through tubes 17 to chamber 18 and thence through the cooling passage defined by the regulator core. The cooled oil is discharged to chamber 45 and flows past thermostat case 73 to the outlet. If the cooling obtained becomes excessive or greater than is necessary, the lowered temperature in chamber 45 will be reflected in a withdrawal of valve 58 to permit some or all of the oil to be by-passed through port 48.

As previously described the temperature control of the oil flow is supplemented by a pressure responsive control in order that the flow will not be interrupted by temporary "freezing" of the oil, or the core tubes damaged by high pressures resulting therefrom. Thus, both valves 56 and 58 will relieve under higher than normal pressures, a special feature of such arrangement residing in the fact that sudden surge pressures are largely dissipated through port 46 before they reach the core inlet. Port 48, which is located beyond the core inlet, therefore is not required to dispose of any pressures except those under that degree necessary to force valve 56 through the port 46.

It will be understood that the invention is concerned with the liquid flow control devices of a liquid temperature regulator, rather than with the particular means by which cooling is obtained. Thus the invention is applicable to a variety of temperature regulators, including the so-called "jacketed" type wherein the casing is surrounded by a spaced jacket to define a passage which replaces the present tubes 17 in conducting the liquid to the core inlet and serves the further purpose of a warming by-pass. In either the jacketed or jacketless type regulators the invention may be used in conjunction with a diffusion method of decongealing, wherein warm oil is introduced into the core at spaced points between the inlet and outlet thereof. In the former instance this is done by means of radial ports in the casing, and in the latter instance by radial ports 10 in the tubes 17.

What is claimed is:

1. In a liquid temperature regulator for controlling the temperature of a liquid which is progressively heated and which circulates under pressure to and from the heat generating means, said regulator being arranged for the passage of the liquid therethrough and having a manifold head formed with an inlet and an outlet; means in the regulator defining a liquid cooling passageway communicating at its opposite ends with said inlet and said outlet; a first conduit in said head leading from said inlet to said outlet in by-passing relation to said cooling passageway; a second conduit leading from said inlet to said outlet in by-passing relation to said cooling passageway and in continuous communication with said passageway; first and second valves in said first and second conduits respectively, each settable to effective and ineffective positions, in the former of which it blocks by-passing of the liquid; independently operable thermal means acting in response to rising liquid temperatures to move said first valve to effective position and then to move said second valve to effective position, and a check valve between said outlet and the terminals of said second conduit and said cooling passageway preventing the application of back pressure thereto from said outlet.

2. A liquid temperature regulator for controlling the temperature of a liquid which is progressively heated and which circulates under pressure to and from the heat generating means, comprising a regulator core including air cooled tubes defining therearound a liquid cooling passageway, the liquid around said tubes tending to congeal when excessively cooled; a casing surrounding said tubes and constituting the shell of the regulator core; and a head mounted on said casing for controlling the flow of liquid to and from said regulator core, said head including a primary flow path to the core and an alternative flow path through which the liquid may be by-passed relatively to the core in the event of congelation therein, pressure responsive means controlling said alternative path and operative to maintain the liquid pressure applied in said cooling passageway at a predetermined value, an auxiliary liquid by-pass encountered by the liquid before its passage through said primary or alternative flow paths, valve means responsive to the temperature of the liquid entering the regulator for closing said auxiliary by-pass when the liquid is warmed to a pre-determined value and responsive to surge pressures to open said auxiliary by-pass, and means for denying access of surge pressures to said cooling passageway.

3. A liquid temperature regulator for use in a system in which the liquid is subjected to heat and circulated under pressure and having a liquid inlet and an outlet, a first passageway connecting said inlet and said outlet, means for cooling the liquid passing through said first passageway, a second passageway connecting said inlet and said outlet, means responsive to a predetermined rise in the temperature of the liquid at said inlet for closing said second passageway and opening said first passageway, a third passageway in communication with said first passageway allowing the liquid to escape to the outlet in by-passing relation to said liquid cooling means, means acting in response to the attainment of a liquid temperature higher than said predetermined temperature for closing said third passageway, and a check valve between said outlet and the terminals of said first and third passageways preventing the application of back pressure to said first and third passageways from said second passageway.

4. A liquid temperature regulator for use in a system in which the liquid is subjected to heat and circulated under pressure, comprising a heat exchange portion and a surrounding casing, said casing having adjacent openings through which the liquid flows in passing to and from the heat exchange portion; a manifold head mounted on said casing in a position overlying said adjacent openings and formed with ports constituting the inlet to the regulator and outlet therefrom; a first conduit in said head directly connecting said inlet and said outlet; a second conduit in said head indirectly connecting said inlet and said outlet, said second conduit communicating at a point intermediate its ends with the opening in said casing through which the liquid flows in entering said heat exchange portion; a valve assembly responsive to the temperature of the liquid entering said inlet for controlling flow through said first conduit and through said second conduit, said assembly being stationed at said inlet and normally operative to close said second conduit and open said first conduit; a chamber in said manifold head constituting the terminal end of said second conduit and communicating with said outlet and with the casing opening through which the liquid flows in leaving said heat exchange portion; a valve in said chamber operable to close the terminal end of said second conduit by shutting off the flow into said chamber from said second conduit; independently operable thermal means respectively in said chamber and at said inlet for operating said valves in sequence to obtain first the opening of said second conduit for flow from said inlet, then the closing of said first conduit, and finally the closing of the terminal end of said second conduit, and a check valve between said outlet and said chamber.

5. A manifold head constituting an integral part of an oil temperature regulator for use in engine lubrication systems, said head being adapted to be mounted on the body of the regulator and having openings constituting the main inlet and the main outlet for the circulating oil, said regulator body having corresponding openings representing the inlet to the body and the outlet therefrom; partitions in said manifold head defining therein a first chamber communicating with said main inlet, a second chamber communicating with said main outlet, a third chamber communicating with the inlet to said body and a fourth chamber communicating with the outlet from said body; a first port connecting said first and second chambers; a second port connecting said first and third chambers; a third port connecting said second and fourth chambers; temperature controlled valves for controlling said first and second ports and operable when the oil temperature at said main inlet is below a predetermined value to open said first port and to close said second port and responding to a rising temperature above said value to open said second port and to close said first port; and a check valve controlling said third port to permit flow therethrough only from said fourth chamber to said second chamber.

6. A manifold head constituting an integral part of an oil temperature regulator for use in engine lubrication systems, said head being adapted to be mounted on the body of the regulator and having openings representing the main inlet and the main outlet of the regulator, said regulator body having corresponding openings respectively connecting with said main inlet and said main outlet and marking the terminals of a cooling passageway; a passage between said main inlet opening and said main outlet opening communicating with the opening in said regulator body marking the entrance to said cooling passageway; first and second temperature responsive valves in said passage respectively upstream and downstream relative to the opening in the regulator body marking the entrance to the cooling passageway, said first valve being constructed and arranged to permit flow thereby in response to rising oil temperature and said second valve being constructed and arranged to prevent flow thereby in response to a rising oil temperature; a port in said head directly connecting said main inlet opening and said main outlet opening; a third valve movable to a position within said port to prevent by-passing flow therethrough; means yieldingly holding said third valve in a position spaced from said port whereby to permit a by-passing flow of the liquid; means for moving said third valve into a position closing said port in accompaniment with motion of said first valve toward open position with respect to said passage; and means permitting movement of said third valve independently of said first valve through and beyond said port under a surge pressure to establish communication between said inlet and outlet irrespective of the position of said first valve or of the temperature of the oil.

7. A liquid temperature regulator for use in a system in which the liquid is subjected to heat and circulated under pressure, comprising a heat exchange portion and a surrounding casing, said casing having adjacent openings through which the liquid flows in passing to and from the heat exchange portion; a manifold head mounted on said casing in a position overlying said adjacent openings and formed with inlet and outlet chambers communicating with respective openings in said casing; a check valve between said outlet chamber and the exit from said heat exchange portion preventing the application of back pressure to said heat exchange portion; a port in said head directly connecting said chambers; a valve assembly responding to the temperature and to the pressure of the liquid entering said inlet chamber for closing said port when the liquid temperature rises to a predetermined value and to open said port when the liquid pressure exceeds a predetermined value, irrespective of the liquid temperature, said assembly including a valve movable under temperature control into said port and movable under pressure through and beyond said port.

WALTER H. GEDDES.
PHILLIP W. SCHANKE.

REFERENCES CITED

The following references are of record in the file of this patent:

UNITED STATES PATENTS

| Number | Name | Date |
|---|---|---|
| 1,992,796 | Young | Feb. 26, 1935 |
| 2,107,188 | Ryder | Feb. 1, 1938 |
| 2,279,285 | Worth | Apr. 7, 1942 |
| 2,288,599 | Ramsaur | July 7, 1942 |
| 2,291,637 | Kohlmann | Aug. 4, 1942 |
| 2,322,047 | Mormile | June 15, 1943 |
| 2,352,704 | Garner | July 4, 1944 |
| 2,353,577 | Magrum | July 11, 1944 |
| 2,353,610 | Chisholm | July 11, 1944 |
| 2,354,371 | Gill | July 25, 1944 |
| 2,359,448 | Shaw | Oct. 1, 1944 |
| 2,374,639 | Miller | Apr. 24, 1945 |
| 2,396,053 | McEntire | Mar. 5, 1946 |

FOREIGN PATENTS

| Number | Country | Date |
|---|---|---|
| 350,065 | Italy | July 5, 1937 |
| 419,023 | Germany | Sept. 26, 1925 |